STEREO RECEIVER SUITABLE FOR INTEGRATED CIRCUIT CONSTRUCTION

Filed March 12, 1969 2 Sheets-Sheet 1

Inventor
Fleming Dias
By Eugene M. Cummings
Agent

July 7, 1970 F. DIAS 3,519,748

STEREO RECEIVER SUITABLE FOR INTEGRATED CIRCUIT CONSTRUCTION

Filed March 12, 1969 2 Sheets-Sheet 2

Inventor
Fleming Dias
By Eugene M. Cummings
Agent

United States Patent Office 3,519,748
Patented July 7, 1970

3,519,748

STEREO RECEIVER SUITABLE FOR INTEGRATED CIRCUIT CONSTRUCTION

Fleming Dias, Chicago, Ill., assignor to Zenith Radio Corporation, Chicago, Ill., a corporation of Delaware
Continuation-in-part of application Ser. No. 599,468, Dec. 6, 1966. This application Mar. 12, 1969, Ser. No. 806,631
Int. Cl. H04j 1/00
U.S. Cl. 179—15 4 Claims

ABSTRACT OF THE DISCLOSURE

A receiver for stereophonic program signals wherein demodulation of a received stereophonic subcarrier signal is accomplished by inductorless demodulation circuitry suitable for integrated circuit construction. An active R-C inductorless filter, located between the receiver frequency-modulation detector and stereo demodulator, extracts the pilot signal from the composite signal with a sufficiently high signal-to-noise ratio to permit derivation of a continuous-wave demodulation signal at the subcarrier frequency within the integrated-circuit demodulation stages without the provision of further tuned circuitry therein.

BACKGROUND OF THE INVENTION

This application is a continuation-in-part of copending United States application Ser. No. 599,468, Dec. 6, 1966, now U.S. Pat. No. 3,466,399, issued Sept. 9, 1969 by the present applicant.

The present invention relates generally to receivers for stereophonic program signals and, more particularly, is directed to new and improved receivers of the foregoing type especially suited for construction either wholly or in part by integrated circuit techniques.

Today electrotechnology is at the threshold of a startling new and different era in circuit fabrication and design. It is foreseeable and, in many instances now practical, to manufacture electrical circuits which occupy a volume many hundreds or thousands of times smaller than even their equivalent transistor predecessors. The advantages of such size reductions are manifest, but of far greater significance are the marked economies and excellent reliability potentially realizable with integrated circuits.

However, utilization of these circuits in certain environments poses substantial challenges to the ingenuity of the electronics engineer. Simple substitution or interpolation in going from conventional to integrated circuits, such as was usually the case in transition from vacuum tube to transistor circuits, is not always feasible, as the device limitations and ground rules for design of integrated circuits are in some respects quite distinct from those of present day circuits. For example, by this new art transistors and similar semiconductor devices are rather easily and economically made while capacitors and resistors are difficult to obtain in a large range of values. In monolithic circuits capacitors larger than a few hundred picofarads and resistors greater than ten thousand ohms are difficult to realize. The situation is, however, several orders of magnitude better with thin film circuits. Furthermore, at present integrated inductors as such do not exist and, accordingly, the effects of these devices must be either synthesized through use of permissible circuit elements or, alternatively, ordinary inductors interconnected where appropriate to the integrated modules. The former approach imposes the problem of designing and selecting simulated inductive circuits matched to the overall circuit combination or system, in many cases a formidable task; the latter, in instances where inductors are distributed throughout the circuit, dictates a number of delicate and expensive connection points between the integrated module and the inductors, or the use of a plurality of modules with the inductors strung therebetween, both of which arrangements tend to defeat the purpose and utility of integrated circuits.

The foregoing problems associated with transformation to integrated circuits are aptly exemplified by reference to a preferred type of discrete component stereo receiver disclosed and claimed in Pat. 3,151,217—Dias which is assigned to the same assignee as the present invention. In this patent, there is shown a stereo demodulator which utilizes three tuned inductors and three more inductor coils each magnetically coupled to a respective one of the tuned circuits. These latter coils provide phase splitting and direct current isolating functions. The tuned inductors are useful as frequency selective filters for a pilot signal and in doubling its frequency to develop a demodulation signal required in reproducing the separated stereo signals.

It is a primary object of the present invention to provide a new and improved stereo receiver susceptible of construction wholly or in part by integrated circuit techniques.

It is a further object of the present invention to provide a stereo receiver including novel circuit combinations especially well-mated to the limitations and requirements of integrated circuits.

It is yet another object of the present invention to provide a stereo receiver having novel, inductorless circuitry.

SUMMARY OF THE INVENTION

Accordingly, the invention is directed to a receiver for developing a pair of stereophonically related program signals from a received transmission comprising a carrier frequency-modulated in accordance with the sum of two audio signals, a subcarrier signal which has been suppressed-carrier amplitude-modulated with the difference of the two audio signals, and a pilot signal subharmonically related to the subcarrier signal. The receiver comprises a frequency modulation detector responsive to the carrier for deriving a composite signal representing the modulation of the carrier. An integrated-circuit, solid-state demodulation signal generator and stereo detector means, consisting of untuned stages all of the bilateral passive circuit elements of which are resistive or capacitive, are included for developing a subcarrier demodulation signal in response to the pilot signal and for deriving the pair of stereophonically related program signals in response to the audio sum signals, the difference signal modulation and the developed subcarrier demodulation signal. Inductorless circuit means, coupled between the frequency modulation detector and the generator and stereo detector means selectively extract the pilot signal from the composite signal with a signal-to-noise ratio of a magnitude sufficiently high to permit derivation of the demodulation signal within the generator and stereo detector means without provision of frequency tuned circuitry therein.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Before considering the invention, it is first appropriate to comment upon the character of the stereophonic transmission. This signal, as prescribed by the specifications of the Federal Communications Commission, comprises a carrier which is frequency-modulated in accordance with the sum of two audio signals. The carrier is also frequency-modulated in accordance with both sidebands of a subcarrier signal which has been suppressed-carrier amplitude-modulated with the difference of the same two audio signals. Since the transmission includes a suppressed-carrier component, a pilot signal prescribed at one-half the frequency of the absent subcarrier is also frequency-modulated on the principal carrier to facilitate synchronization of receiver instruments. A comprehensive explanation of the theory and operation of the F.C.C. approved stereo transmission and reception system is provided in Pat. 3,257,511 to Adler et al.

Figures 1, 2:
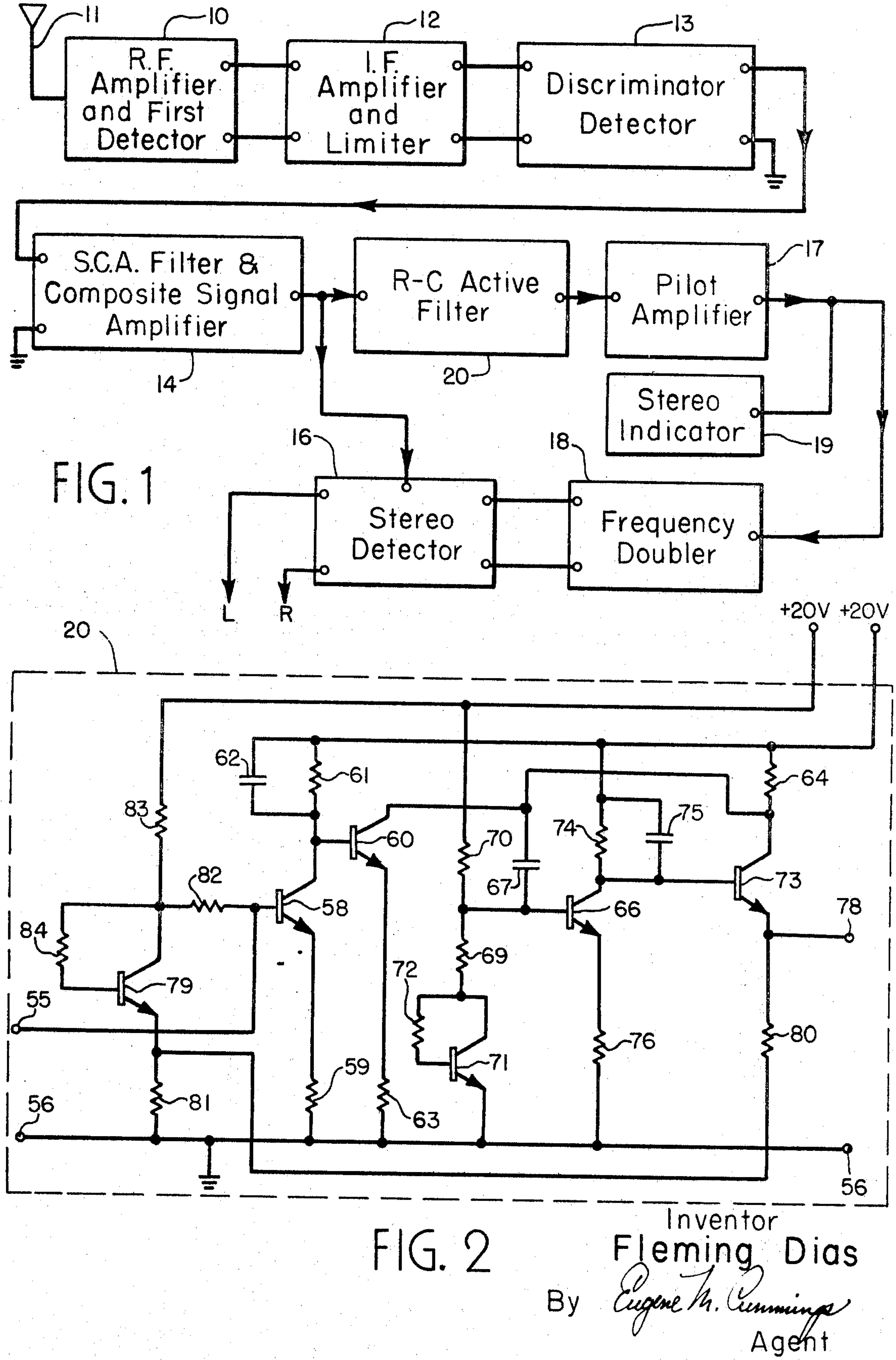
FIG. 1 is a block diagram representation of a preferred embodiment of a stereo receiver of the present invention utilizing resistance-capacitance active filter means in a novel manner.
FIG. 2 is a schematic circuit diagram of a resistor-capacitor active filter means of the type represented in block form in FIG. 1.

Referring now to FIG. 1, the arrangement there shown comprises receiver circuits which through the SCA filter and composite amplifier are conventional, although in connection with other figures to be described, it is preferred that these stages be constructed as integrated circuitry. These includes a radio frequency amplifier of any desired number of stages and a heterodyning stage or first detector, both being represented by block 10. The input of the amplifying portion connects with a wave-signal antenna 11 and the output is coupled to a unit 12 which may include the usual stages of intermediate frequency amplification and one or more amplitude limiters. Following IF amplifier and limiter 12 is a frequency modulation detector 13 responsive to the amplitude limited IF signal for deriving an output waveform representing the modulation of the received carrier. Second detector 13 may be of any well-known configuration, but since a high degree of amplitude limiting is desirable, it is preferable that this unit be a ratio detector. The composite modulation signal developed at the output of detector 13 is applied to an SCA filter and composite signal amplifier labeled 14. The filter of block 14 serves as an attenuator for the subcarrier frequency used for Subsidiary Communications Authorization (SCA) reception, a subscription background music service authorized by the Federal Communications Commission.

A stereo detector 16 is coupled to the output of composite amplifier 14 and is responsive to the audio sum signal, the suppressed-carrier amplitude-modulated difference signal and a demodulation signal developed from the pilot tone and having a frequency and phase equal to that of the absent subcarrier for deriving a pair of stereophonically related audio signals, schematically indicated L and R in the drawing. The L and R audio signals are applied to individual amplifying and reproducing apparatus, not shown, the loudspeaker portions of which are, of course, spatially arranged to create a stereophonic sound pattern in the area they serve.

Since, as explained, the absent subcarrier must be recreated at the receiver, demodulation signal generator means are provided to effect this end. These means include a pilot amplifier 17 and a frequency doubler 18. A stereo indicator mechanism 19 is coupled to the output of amplifier 17 and is responsive to the presence of the pilot to provide an indication of stereo reception via an indicator lamp or the like. Of course, block 19 is not essential and may be omitted if desired. In accordance with the invention, the stereo detector and demodulation signal generator means are constructed as an integrated, solid-state unit consisting of untuned stages of which all the bilateral passive circuit elements are resistive or capacitive, without the provision of any frequency tuned circuitry therein. Furthermore, in the unique combination of the present invention, there is no sacrifice in pilot frequency selectivity as compared with that of conventional receivers, and there is no requirement for multiple interconnections between the integrated circuit means and tuned inductors of other stages.

Specifically, and in further accord with the invention, the foregoing advantages are realized by provision of a single inductorless selectivity block 20 preceding the generator and stereo detector means. Block 20 is provided with a passband sufficiently narrow to extract the pilot tone from the composite signal with a signal-to-noise ratio adequate to permit derivation of the demodulation signal within the integrated-circuit stages 16–18 without the provision of further tuned circuitry therein. More particularly, filter 20 is constructed to have a circuit Q of at least 50 and, preferably is designed with a Q of 60 or greater to sharply attenuate of 20 kHz. control signal used by some broadcasters in connection with a "Simplex Service" for background music; such a characteristic has been found quite adequate in practice.

Before proceeding further, it should be understood that the expression "integrated circuits" as used in the present specification and the appended claims is intended to be a broad and generic term embracing, inter alia, present integrated circuits of the monolithic, thin and thick film types. As used in the art, the term monolithic is descriptive of circuits which are formed as a volume unit without apparent distinct parts; on the other hand, thin film circuits have distinguishable individual components placed adjacent one another by well-known thin film deposition techniques, as vapor deposition, on a base or substrate. Thick films differ physically from thin films as their respective names denote; also the former structures are usually made by a screening rather than a vapor deposition process.

It is obvious that the above-described circuit arrangement of the invention greatly relaxes the component and functional requirements on the stereo detector and generator means in terms of compatibility of these elements with integrated circuits. Accordingly, a variety of integrated circuit forms may be taken by functional blocks 16, 18 and 19 of FIG. 1 within the scope of the known art. A preferred circuit construction will, however, be described in detail later herein.

Filter 20 comprises a resistor-capacitor active filter, the characteristics of which are compatible with the requirements of stereo reception. As is understood in the art and as will be described more fully later herein in connection with a preferred filter construction of this type, filter 20 does not employ any inductors, i.e., it is inductorless, and is readily susceptible to construction by known integrated circuit techniques. Accordingly, all of the circuitry illustrated in FIG. 1 may be comprised of a single integral solid-state unit, for example, a single monolithic chip of semiconductor material or several monolithic chips appliqued on a thin film substrate.

A schematic illustration of a known resistor-capacitor active filter circuit suitable for use as filter 20 in the embodiment of the invention shown in FIG. 1 is illustrated in FIG. 2. The configuration of such a filter is basically that of an amplifier with controlled multiple feedback loops used to desensitize the unit to variations in temperature and in transistor gain. Such desensitizing is essential as the circuit must be brought to the verge of oscillation in order to perform the desired filtering function; absent desensitizing the circuit may break into oscillation or the passband thereof may drift considerably from the desired median frequency.

Considering now the circuit construction, an input to the filter is provided between a terminal 55 and a common or ground terminal 56. Terminal 55 is coupled to the base electrode of an amplifier transistor 58. The emitter of this transistor is coupled to ground through a small resistor 59 while the collector is connected to the base electrode of a second amplifier transistor 60 and to a B+ supply through a load resistor 61 bypassed by a filter capacitor 62. The emitter of transistor 60 is coupled to ground through a resistor 63; the collector electrode is coupled to the B+ supply by a load resistor 64 and to the base of a succeeding transistor 66 by a coupling capacitor 67. The base electrode of transistor 66 is provided with a constant steady state current input from the junction of a pair of load resistors 69 and 70 of a transistor 71. The collector of transistor 71 is coupled to its base electrode through a bias resistance 72. The collector of transistor 66 is coupled directly to the base of yet another transistor 73 and to the B+ supply through a resistor 74 bypassed by a capacitor 75. The emitter of transistor 66 is coupled to ground by a resistor 76. The output of the filter is available between the emitter terminal 78 and common terminal 56. The emitter of transistor 73 is also returned to the emitter electrode of a transistor 79 by a feedback resistor 80. The emitter of transistor 79 is coupled to ground through a resistor 81 while its collector is connected to the common junction of resistors 82, 83 and 84 which are respectively coupled to terminal 55, the B+ supply, and the base electrode of transistor 79. Transistor 79 is a unity gain, non-inverting amplifier which functions to provide a constant steady state collector current to transistor 58. Transistor 79 cooperates with respect to transistor 58 as does transistor 71 with respect to transistor 66. A minor positive feedback loop exists between transistor 73 and the base of transistor 66 while feedback resistor 80 establishes a major negative feedback loop to the emitter junction of transistor 79. Due to the application of these multiple nested feedback loops, the overall amplifier response simulates that of an LCR tuned circuit.

The theory of operation of the filter just described is exceedingly complex and an understanding thereof is unnecessary for a complete appreciation of the present invention and for these reasons will not be considered in further detail. However, a complete understanding of filter circuits very similar to that illustrated may be had by reference to a published Engineering Research Laboratory Report No. 65–31 AF–AFOSR–139–64/139–65, University of California, Berkeley, Calif., and entitled "Synthesis of Integrated Selective Amplifiers for Specified Response and Desensitivity" by Ammon Gaash which is available on request from the University of California.

Figure 3:
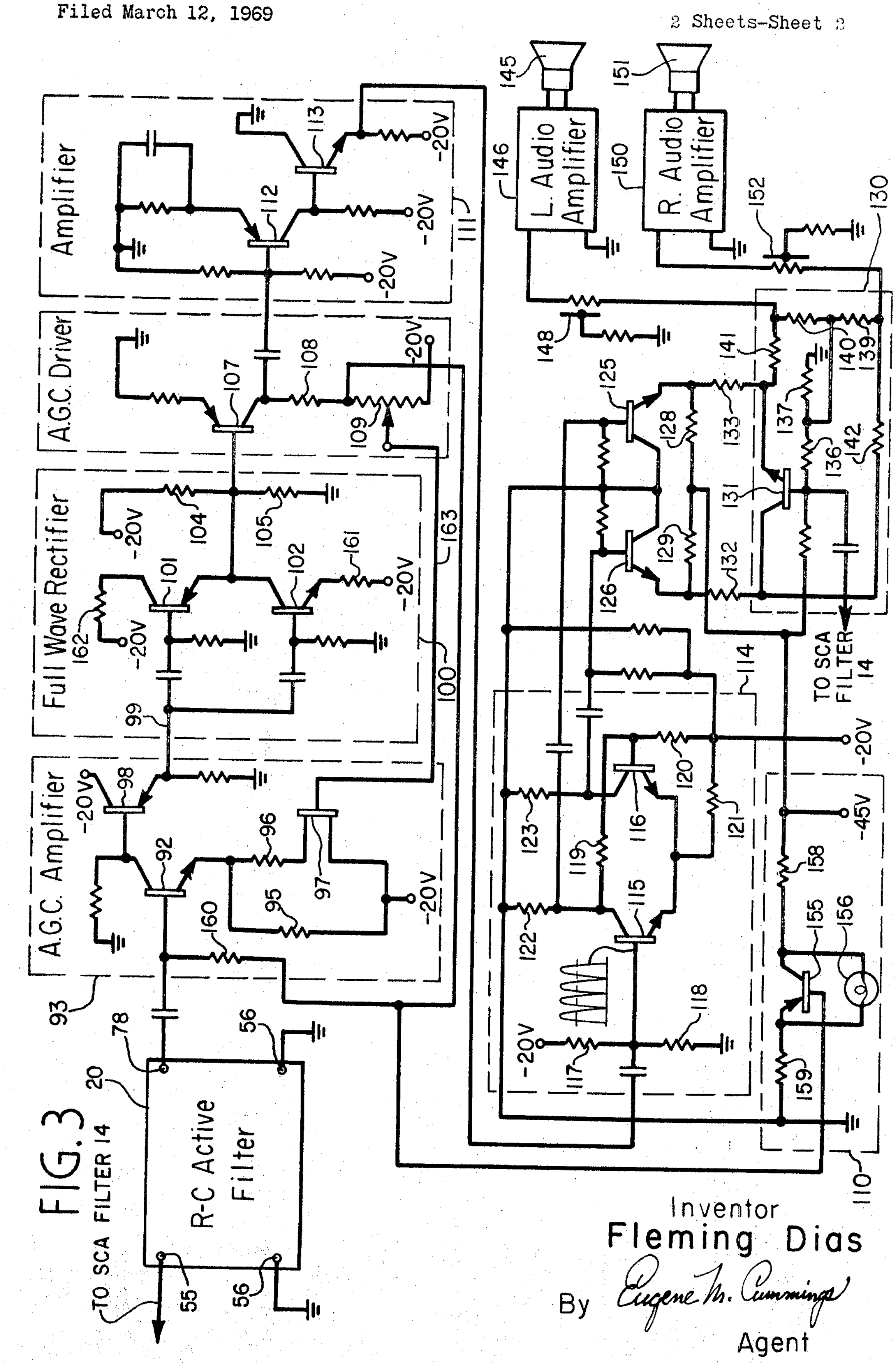
FIG. 3 is a schematic diagram of preferred stereo receiver circuitry, a major portion of which is useful in the embodiment of FIG. 1.

A preferred demodulation signal generator and stereo detector means aptly suited for integrated circuit construction is shown in FIG. 3. This circuit is suitable for use with the system shown in FIGS. 1 and 2, because of novel circuitry to be described, is to be preferred for use with that system. As shown, the composite stereo signal is applied to a frequency selective block 20, which is preferably identical to that depicted in FIG. 2 and, accordingly, has been assigned the same numeral. One input terminal 55 of filter 20 is coupled to the output of the receiver SCA filter 14, and the other terminal 56 is grounded. One output terminal 78 is coupled by a DC blocking capacitor to the base electrode of an NPN transistor 92 of an automatic gain control stage 93. The emitter circuit of transistor 92 is coupled to a negative operating source —20 v. and includes a degenerative resistance network composed of a large resistor 95 coupled in shunt with a resistor 96 and the source and drain electrodes of a field effect type transistor 97. As will become apparent, transistor 97 functions as a variable resistance, responsive to a control signal applied to its base, to adjust the gain of the AGC amplifier 93 within a prescribed range. The collector of transistor 92 is connected to ground through a load resistor and to the base electrode of a PNP emitter follower output transistor 98.

The amplified pilot signal available at an output terminal 99 of emitter follower transistor 98 undergoes full-wave rectification in a succeeding stage, enclosed within dashed outline 100, without provision of either inductor or amplifier type phase-splitting stages. Specifically, this circuit comprises a pair of complementary transistors 101 and 102, of respectively a PNP and NPN gender, so arranged that a pilot signal available at terminal 99 is applied in a common phase to the base electrodes of these transistors through like coupling networks each comprising a series capacitor and a resistor shunted to ground. If desired, the DC blocking or coupling capacitors may be eliminated by balancing terminal 99 against ground through use of a suitable voltage divider network and positive and negative polarity power supplies. The emitter electrode of transistor 101 and the collector electrode of transistor 102 are coupled to a common load comprising the common junction impedance of voltage divider resistances 104 and 105 and a succeeding transistor stage to be described. Resistors 104 and 105 likewise provide an operating bias for the several transistors.

Transistors 101 and 102 are operated as Class B amplifiers. Accordingly, on positive half-cycles of the applied pilot signal, only transistor 101 conducts while on half-cycles of opposite or negative phase only transistor 102 is conductive. By well-understood transistor action, the positive phase signals at the base of transistor 101 appear in like phase at its emitter electrode and negative phase half-cycles applied at the base of transistor 102 appear at its collector electrode in an opposite phase, thus resulting in full-wave rectification of the pilot signal as intended. The alternate half-cycles are established at like amplitude by adjusting the relative magnitudes of the emitter resistor of transistor 102 and the emitter resistor 105 of transistor 101. The emitter of transistor 102 and the collector of transistor 101 are coupled by load resistors 161 and 162, respectively, to a —20 v. operating supply for proper transistor biasing.

The rectified pilot signal is coupled to a PNP amplifier transistor 107 which serves as a driver for the automatic gain control system. To accomplish this function, the collector circuit of transistor 107 includes a pair of series connected load resistances 108 and 109, the latter of which is a potentiometer bypassed for the pilot frequency by capacitor 91 and having its adjustable tap returned via a conductor 163 to the base of variable resistance transistor 97. The control signal derived at the potentiometer tap adjusts the gain of transistor 92 via variable resistor 97 such that the pilot signal amplitude is held at a constant level over a given range independent of variations either in circuit components or reception conditions. Of course, the magnitude of this level is established by the setting of the potentiometer tap. A direct connection from the bypassed terminal of potentiometer 109 provides via a resistor 160 a favorable operating bias for the base of transistor 92 and a control signal for a stereo indicator circuit 110 to be described in response to the presence of a stereo pilot signal exceeding a threshold level.

AGC driver transistor 107 is followed by a substantially conventional linear amplifier 111 comprising a PNP transistor 112 biased for Class A operation and an NPN emitter follower transistor 113. At the output of this stage there is available a full-wave rectified 19 kHz. pilot tone which is utilized in the present receiver as a synchronizing signal to directly develop, without further frequency-tuned circuits, a stereo demodulation signal constituting a replica of the of the absent subcarrier. The means for effecting this result comprises a multivibrator which in the illustrated and preferred embodiment takes the form of a Schmitt trigger type monostable multivibrator, shown enclosed by dashed outline 114. This device includes a pair of cross-coupled NPN transistors 115 and 116. Under quiescent conditions, transistor 115 is nonconductive and transistor 116 is conductive; a positive going signal exceeding a given magnitude at the base of transistor 115 reverses this situation but only for the duration of the signal. A Schmitt trigger multivibrator circuit which unlike the arrangement here described is used conjointly as both a demodulation signal generator and stereo detector is disclosed and claimed in a copending application Ser. No. 398,950 to Dias et al. and is assigned to the same assignee as the present invention.

Turning now to a more specific consideration of the circuit, the rectified pilot signal is directly applied to the base electrode of transistor 115 by a DC blocking capacitor. This electrode also receives an operating bias from the junction of a voltage divider comprising series connected resistors 117 and 118 extending from source —20 v. to ground. The other multivibrator transistor 116 has its base electrode cross-coupled to the collector electrode of transistor 115 by a resistor 119 and is further connected to a –20 v. supply by a resistor 120. The common emitters of transistors 115, 116 are returned to a —20 v. supply through a small resistor 121 while their collector electrodes are individually coupled to reference or ground potential through respective load resistors 122 and 123. These collector electrodes are also individually connected to emitter follower transistors 125 and 126 of the NPN type through respective coupling capacitors.

Transistors 125, 126 comprise a push-pull output or buffer stage for multivibrator 114. The base electrodes of these transistors receive appropriate operating biases from the center junction of a pair of similar voltage divider networks extending between ground potential and the —20 v. supply. The common ground terminal of these networks is also coupled directly to the collector electrodes of transistors 125, 126. The respective emitter load resistors 128, 129 of these transistors are coupled by a common junction to a —45 v. power supply. A substantially square-wave switching signal of a frequency and phase identical to that of the absent subcarrier is developed between the emitter electrodes of transistors 125, 126 in response to a received pilot signal and is employed to synchronize a stereo detector shown within dashed outline 130.

As previously discused, a stereo transmission is in a composite form, namely, a sum or $L+R$ audio component and difference or $L-R$ component present as amplitude modulation on a suppresed subcarrier. Reproduction of the separate stereo channels at the receiver requires demodulation of this latter component and matrixing in proper amplitude and phase relationship with the audio sum component. In the present receiver, the stereo detector preferably comprises a single NPN transistor 131 having a pair of load resistors 132 and 133 coupled from its collector and emitter electrodes, respectively, to respective emitter terminals of transistors 126, 125. The base electrode of detector transistor 131 reecives the composite stereo information from SCA filter 14 through a coupling capacitor. For reasons that will be made more apparent hereinafter, concurrent application of the subcarrier demodulation signal and stereo information to the described electrode of detector transistor 131 receives the composite difference signal information being developed at equal levels by opposite polarities in the detector load resistors 132, 133; no other audio components are developed across these resistors.

In order to develop respectively a pure L and a pure R signal, the demodulated $(L-R)$ and $-(L-R)$ audio information must be individually combined or matrixed with a measured amplitude of the audio sum $(L+R)$ signal. As illustrated, a matrix signal is derived from the center tap of a voltage divider comprising a pair of load resistors 136 and 137 couple between the base of detector transistor 131 and ground potential and is applied to the midpoint of a pair of summing resistors 139 and 140.

Like summing resistors 141 and 142 are coupled from the emitter and collector electrodes of detector transistor 131 to the remaining terminals of resistors 140 and 139, respectively. Matrixing takes place at the junctions of resistors 140, 141 and 139, 142 to develop at these junctions pure L and pure R audio signals. As shown, the L audio signal is coupled to a loudspeaker 145 through an audio amplifier 146 and a combined subcarrier notch and de-emphasis filter 148. Similarly, the pure R audio signal is coupled to a loudspeaker 151 by an audio amplifier 150 and a subcarrier notch and de-emphasis filter 152. The respective de-emphasis filters 148, 152 also effectively filter the super-audible portions of the composite matrixing signal and the subcarrier switching signal to preclude possible overloading of the following audio amplifiers. A stereo detector of the type here shown and variations thereof are disclosed and claimed in Pats. 3,151,217—Dias and 3,151,218—Dias et al. which are assigned to the same assignee as the present invention.

A visual indication of stereo reception is provided by means 110 which comprises a transistor 155 coupled to shunt a pilot indicator bulb 156. Transistor 155 is normally in an on or saturated condition but in response to a control signal at its base electrode which is indicative of the presence of the stereo pilot tone, this transistor assumes an off or nonconductive condition. In this latter circumstance, indicator bulb 156 is connected in series with a pair of current limiting resistors 158, 159 between a —45 v. supply and ground and lights to denote stereo reception.

In considering the operation of the receiver, it will be assumed initially that a monaural program is being received and, therefore, the signal available at the output of SCA filter 14 consists of only audio frequency information. Under these circumstances, the pilot amplifier and doubler chain is in a quiescent or inoperative state. Specifically, AGC amplifier 92 is in a low gain condition by virtue of the high resistance of transistor 97 in its emitter circuit and the lack of a favorable bias at its base electrode. The low gain characteristic of transistor 92 under quiescent conditions is preferable as it substantially prevents false actuation or triggering of the pilot chain in response to typical brief duration random noise, particularly noise that may reach the amplifier as the receiver is tuned over its band.

In addition, during this quiescent state a substantial negative potential is applied to the base of transistor 155 through bypassed potentiometer resistance 109. Thus, transistor 155 is rendered heavily conductive and shunt indicator lamp 156 is de-energized.

The received monaural signal available at SCA filter 14 is also applied to the base electrode of stereo detector transistor 131, however, in the absence of a demodulation signal both primary electrodes of this transistor are at a higher potential compared to the base and thus the transistor has a net back or reverse bias which renders it inoperative. The monaural information is translated to the individual amplifying and reproducing means only through the center tap of summing resistors 139, 140. Since both channels are of nominally the same resistance, the monaural information is translated thereto in equal amplitudes and reproduction takes place in conventional monaural fashion.

If the received program is an FM stereophonic broadcast, the output available from the SCA filter and composite amplifier corresponds to the composite modulation signal of that broadcast. The pilot tone portion of this signal is extracted from the remaining components by selectivity block 20 and is applied to the base electrode of amplifier transistor 92. There is sufficient gain in this amplifier, assuming the pilot exceeds a threshold, to translate the 19 kHz. tone to the previously described full-wave rectifier 100 and the succeeding AGC driver stage. The rectified pilot signal is from there coupled to an amplifying stage 111, the construction of which was previously described.

Of course, the primary function of driver transistor 107 is to provide a high level control potential in response to the presence of the rectified pilot signal. This control potential is developed across bypassed potentiometer 109 and the connection from the high potential terminal of this impedance simultaneously provides a positive, favorable operating bias for the base electrode of AGC amplifier transistor 92 and a reverse bias for stereo indicator transistor 155. Indicator bulb 156 is thus lit to visually acknowledge the reception of a stereo program. In addition, a movable tap on potentiometer 109 provides an adjustable bias for the base electrode of variable resistance transistor 97. When the bias at the base electrode of transistor 97 increases sufficiently to exceed an operative threshold, the resistance of this device is automatically varied so as to dynamically limit the amplitude of the full-wave rectified pilot signal to a prescribed level proportional to the positioning of the movable potentiometer tap.

As will be recalled, Schmitt trigger circuit 114 comprises a pair of transistors 115 and 116 and during quiescent conditions transistor 116 is in a saturated or on condition and transistor 115 is nonconductive. In conformity with conventional monostable multivibrator operation, a signal of an appropriate value at the base of transistor 115 initiates conduction therein while simultaneously biasing ransior 116 o neinnnetaoieatoietaoinn taneously biasing transistor 116 to an off condition through coupling resistor 119. During stereo reception, the Schmitt trigger circuit is actuated by the full-wave rectified pilot signal sketched on FIG. 3 adjacent transistor 115. The dashed line on the sketch represents the nominal operating bias at the base electrode of transistor 115 from voltage divider 117, 118 and a signal amplitude above the dashed line renders transistor 115 conductive. Proper adjustment of this bias allows multivibrator transistor 115 to be on during a time equal to that of one-half the period of the rectified pilot tone and off during the remaining one-half period, thus establishing a desired 50–50 duty cycle for the multivibrator. As is apparent, a square-wave switching signal at twice the rate of the 19 kHz. tone is thus generated at the collector electrodes of the multivibrator transistors and is applied in push-pull to the load circuits 132, 133 of stereo detector 131 through buffer amplifiers 125, 126.

Concurrently with the application of the 38 kHz. demodulation signal to the primary electrodes of stereo detector or transistor 131, the composite stereo signal is applied to its base electrode from SCA filter 14. As explained more fully in the previously mentioned Dias and Dias et al. patents, the suppressed-carrier amplitude-modulation components of the composite signal are detected in one polarity in load resistor 132 and in an opposite polarity in load resistor 133 by intermodulation with the subcarrier-frequency demodulating signal. By the complex action of this detector, the audio sum signal is not translated through the base electrode to either of the load circuits. Hence, the matrixing connection taken from the midpoint of the voltage divider resistors 136, 137 is necessary to effect the desired stereo separation. The high frequency components applied through the matrixing connection are bypassed to ground by respective de-emphasis filters 148 and 152, no additional filtering being needed.

The demodulation signal generator and stereo detector means above-described performs comparably with conventional stereo receivers while utilizing components of only types and magnitudes capable of construction by integrated circuit techniques. Further, the described full-wave rectifier accomplishes its function without provision of a separate phase-splitting means as required in the prior art.

I claim:

1. An FM receiver for developing a pair of stereophonically related program signals from a received transmission signal comprising a carrier wave frequency-modulated in accordance with the sum of two audio signals, a subcarrier signal which has been suppressed-carrier amplitude-modulated with the difference of said two audio signals, and a pilot signal subharmonically related to said subcarrier signal, said receiver comprising:

a frequency-modulation detector responsive to said carrier wave for deriving a composite signal representing the modulation of said carrier;

filter means, including a resistor-capacitor active filter coupled to said output, for selectively extracting said pilot signal from said composite signal;

solid-state demodulation signal generator means for developing a subcarrier demodulation signal in response to said pilot signal; and solid-state stereo detector means, including a pair of load resistors and a transistor having its base electrode coupled to said frequency-modulation detector and its emitter and collector electrodes coupled to said demodulation signal generator means through respective ones of said load resistors, for deriving said pair of stereophonically related program signals in response to said audio sum signal, said difference signal modulation, and said developed subcarrier demodulation signal.

2. An FM receiver for developing a pair of stereophonically related program signals from a received transmission signal comprising a carrier wave frequency-modulated in accordance with the sum of two audio signals, a subcarrier signal which has been suppressed-carrier amplitude-modulated with the difference of said two audio signals, and a pilot signal subharmonically related to said subcarrier signal, said receiver comprising:

a frequency-modulation detector responsive to said carrier wave for deriving a composite signal representing the modulation of said carrier;

filter means, including a resistor-capacitor active filter coupled to said output, for selectively extracting said pilot signal from said composite signal;

solid-state demodulation signal generator means, including a pair of complementary transistors each including emitter, base, and collector electrodes, for developing a subcarrier demodulation signal in response to said pilot signal;

coupling means for applying said pilot signal in a common phase to said base electrodes;

means, including a common load impedance coupled to an emitter electrode of one of said transistors and a collector electrode of the other of said transistors, for effecting full-wave rectification of said pilot signal; and solid-state stereo detector means for deriving said pair of stereophonically related program signals in response to said audio sum signal, said difference signal modulation, and said developed subcarrier demodulation signal.

3. A receiver according to claim 2, in which the remaining collector and emitter electrodes of said transistors are coupled to individual load impedances of a relative magnitude for equalizing the amplitude of alternate half-cycles of said full-wave rectified pilot signal.

4. A receiver according to claim 3, which further comprises:

an automatic gain control transistor coupled between said pilot signal extracting means and said coupling means;

a field effect transistor including source, drain, and base electrodes and having said source and drain electrodes coupled in series with the emitter of said gain control transistor; and means for applying the DC component of said full-wave rectified pilot signal to said base electrode in a polarity to maintain the magnitude of said rectified pilot signal substantially constant over a predetermined range independent of variations in the amplitude of said pilot signal as applied to said base electrodes of said complementary transistors.

References Cited

UNITED STATES PATENTS

| | | | |
|---|---|---|---|
| 3,286,034 | 11/1966 | Rypkema | 179—15 |
| 3,286,035 | 11/1966 | Dias et al. | 179—15 |
| 3,297,286 | 1/1967 | Dias et al. | 179—15 |
| 3,360,608 | 12/1967 | Rypkema | 179—15 |
| 3,384,716 | 5/1968 | Takano | 179—15 |
| 3,424,870 | 1/1969 | Breeden et al. | 179—90 XR |
| 3,436,485 | 4/1969 | Eckenbrecht | 179—15 |

KATHLEEN H. CLAFFY, Primary Examiner

T. J. D'AMICO, Assistant Examiner